United States Patent [19]
Keskes et al.

[11] Patent Number: 6,032,103
[45] Date of Patent: Feb. 29, 2000

[54] METHOD FOR LOCATING AND IDENTIFYING SITE ANOMALIES

[75] Inventors: Naamen Keskes, Pau; André Bidegaray, Bordes, both of France

[73] Assignee: Elf Exploration Production, France

[21] Appl. No.: 08/973,771

[22] PCT Filed: Apr. 9, 1997

[86] PCT No.: PCT/FR97/00628

§ 371 Date: Jan. 23, 1998

§ 102(e) Date: Jan. 23, 1998

[87] PCT Pub. No.: WO97/39366

PCT Pub. Date: Oct. 23, 1997

[30] Foreign Application Priority Data

Apr. 15, 1996 [FR] France .................................. 96 04681

[51] Int. Cl.[7] ...................................................... G06F 19/00
[52] U.S. Cl. ............................................................. 702/16
[58] Field of Search .............................. 706/929; 702/11, 702/12, 13, 16, 17; 367/72, 73

[56] References Cited

U.S. PATENT DOCUMENTS 4,747,054  5/1988  Chittineni et al. .
4,964,103  10/1990  Johnson .................................. 367/73

FOREIGN PATENT DOCUMENTS 2226884   7/1990   European Pat. Off. .
0562687   9/1993   European Pat. Off. .
0745870  12/1996   European Pat. Off. .

*Primary Examiner*—Donald E. McElheny, Jr.
*Attorney, Agent, or Firm*—Ostrolenk, Faber, Gerb & Soffen, LLP

[57] ABSTRACT

A method for locating and identifying site anomalies. According to the method, a given seismic block of seismic traces located by their space coordinates is used. The seismic block is demarcated in at least one time interval between a higher level and a lower level. A time-model of one anomaly is selected. The model is correlated with each of the traces within the time interval. For each trace, the maximum correlation ($\Gamma_M$) and the corresponding time ($t_i$) of the said maximum correlation are calculated. A maxima correlation chart equal to the spatial dimensions of the seismic block and a chart of the times corresponding to the correlation maxima are drawn, in which the time chart is of the same dimensions and located in the same system of coordinates (x, y) as the maxima correlation chart.

8 Claims, 8 Drawing Sheets

METHOD FOR LOCATING AND IDENTIFYING SITE ANOMALIES

CROSS-REFERENCES TO RELATED APPLICATIONS

NOT APPLICABLE

STATEMENT REGARDING FEDERALLY SPONSORED RESEARCH OR DEVELOPMENT

NOT APPLICABLE

BACKGROUND OF THE INVENTION

1. Field of the Invention

This invention is about a procedure to localize and identify anomalies of a medium like the ones found during seismic campaigns.

2. Description of the Related Art

The image of a seismic area is generally shown as one or many two-dimensional seismic section, referred to as seismic 2D, defined by axis x and t, or by three-dimensional seismic sections, referred to as seismic 3D, defined by axis x, y and t or z, where t is time and z is depth.

In a seismic block, a seismic event is found partly by one or many shot points and from the receivers associated with the shot point, defined by their coordinates at axis x and y, and partly by the time t it takes to go from the shot point to the corresponding receiver or the depth z where it is located.

An anomaly is viewed by interpreters as a seismic event. The study of anomalies in a medium allows for better understanding of the medium, as some anomalies can be clues on the presence or absence of hydrocarbons (water and oil) in the given medium.

The detection of anomalies on a seismic section comprised of a large number of seismic traces previously assembled within given criteria as for example in common middle points (CMP), at a common receiver, etc . . . is done manually by the interpreter. Subsequently, the selection or rejection of an anomaly depends solely on the judgment of the interpreter and his ability to interpret the seismic section correctly. FIG. 1 represents a seismic section (x, t) on which anomalies, A1 and B1 for example, are platted by the interpreter. The plotted anomalies can be considered as either different, identical or of the same nature. As can be seen in FIG. 1, to the left and in the second lower half, many anomalies Al that overlap can be found, making it difficult to determine their nature. In the presence of a fault in a medium, it is often faced two anomalies which are unrelated. These two anomalies are on different levels and can be viewed as the same from one end to the other of the fault while the interpreter views each as divided and delimited by the fault without being able to clear the ambiguity.

In any case, the manual detection of an anomaly cannot take into account all anomalies especially those that are barely visible or that are hidden by other anomalies.

BRIEF SUMMARY OF THE INVENTION

This invention presents a method to localize and identify every anomaly which exist between two predetermined levels that are either real or fictitious horizons of the medium to be explored.

This invention consists of a method which consists of:

Using a given seismic block composed of seismic traces located from their spatial locations;

Delimiting in the said seismic block by at least one temporal interval between an upper level and a lower level;

Selecting the temporal model of an anomaly;

Correlating the model with each of the traces within the said temporal interval;

Determining for each trace, the maximum correlation and time corresponding to the maximum correlation;

Developing a map of the maximum correlations equal to the spatial dimensions of the seismic block and a map of the times corresponding to the maximum correlations, time map having the same dimensions and located in the axial system than map of the maxima correlation.

An advantage of this invention is that it automatically sweeps a whole seismic section by marking successive intervals, adjacent or not, to the above mentioned seismic section.

According to another characteristic of this invention, the map of times is segmented in an assembly of zones connected and homogeneous, every one of which being like a point in the above mentioned zone consists of at least one adjacent point not containing discontinuity in time superior to a given threshold ($\Delta t$).

Another advantage is to detect every anomaly by their connex components.

According to another characteristic, every homogeneous zone where at least one point represents a maximum correlation higher than a predetermined correlation threshold (S) is selected, every zone representing advantageously a surface higher than a given value.

An advantage lies in the fact that every anomaly is taken into consideration and in that the relevant anomalies of predetermined criteria can be selected. In this case, every anomaly that is of non or little relevance are rejected and considered insignificant.

According to another characteristic, every homogeneous zone is considered individually by a propagator in a way to cover the above mentioned zone in every direction while controlling the correlation with neighboring seismic traces.

Thus, it is possible, thanks to this invention, to detect anomalies that are covered and difficult to detect manually while limiting their outline.

According to another characteristic, homogeneous zones and their extensions constitute anomalous zones that are organized in a number of layers such that within every layer, two anomalous zones are not covered by one another, the layers being, for example, in an order decreasing from the maxima correlation.

An advantage that lies in this characteristic comes from the fact that anomalies can be categorized in relation to each other, for example following a decreasing maxima correlation, and the different levels of anomalies places in memory.

Finally, according to another characteristic, every anomaly is validated by controlling the time-correlation relations in a way that only the anomalies with a maximum correlation over a minimum time are kept which allows, amongst other things, to validate every anomaly and make marker cards for each anomaly. Every card can include amplitude, origin, spatial coordinates, surface, etc.

Other characteristics and advantages will become more clear during the reading of a preferred embodiment of the invention.

DETAILED DESCRIPTION OF THE INVENTION

Figure 1:
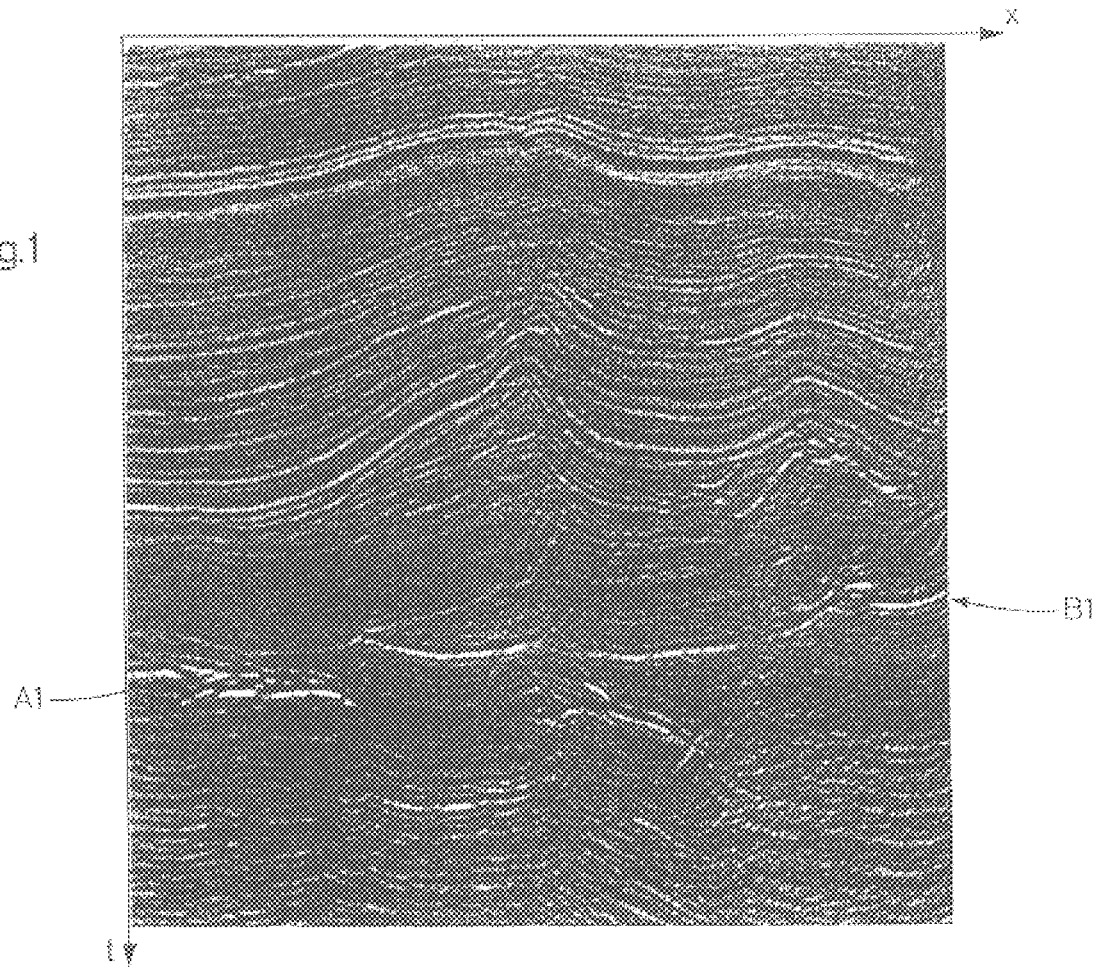
FIG. 1 is a 2D seismic section.
Figure 2:
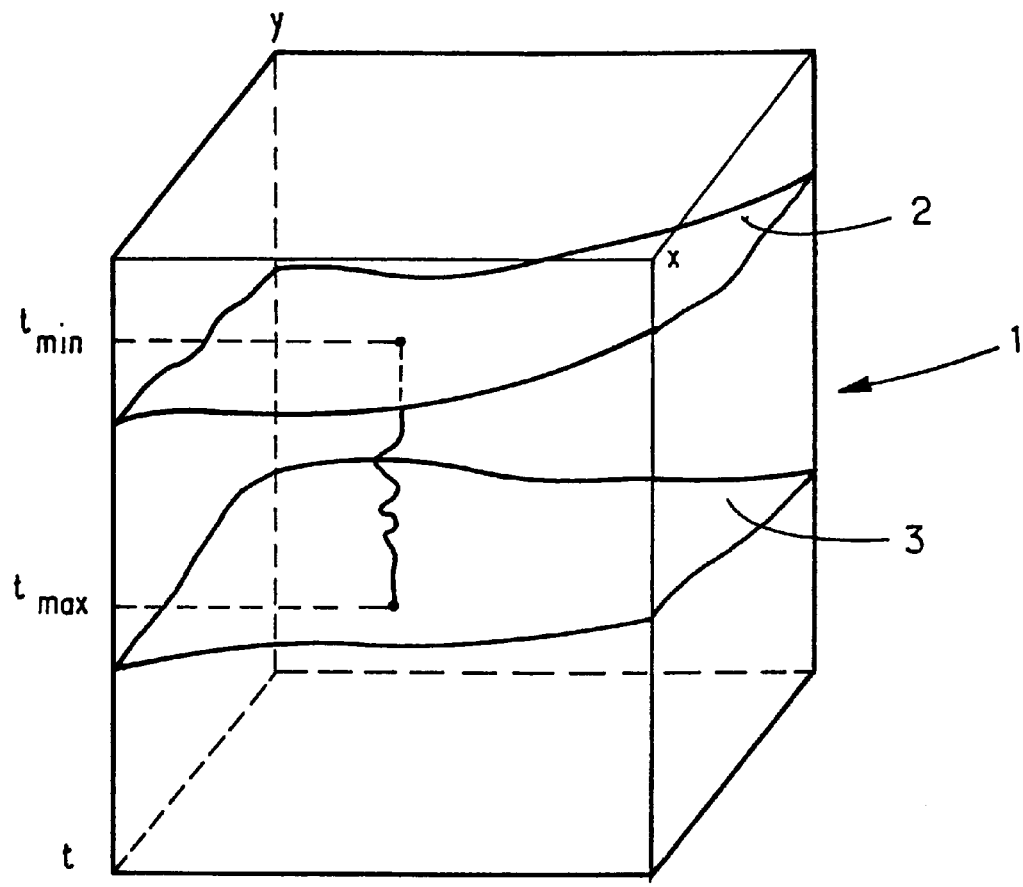
FIG. 2 is a schematic representation of a seismic block (x, y, t)

According to the invention, a 3D seismic block is carried out that represents the medium (FIG. 2) and that contains a large number of seismic traces as a result, for example, of a collection of traces in common mid point (CMP(step 10)). In the block 1, we define a delimited temporal interval by an upper level 2 and a lower level 3 indefined, the upper levels 2 and lower levels 3 corresponding to real or fictitious horizons but that for all practical purposes, the considered interval corresponding to a given minimum time $t_{min}$ and a maximum time $t_{max}$(step 12).

Figure 3:
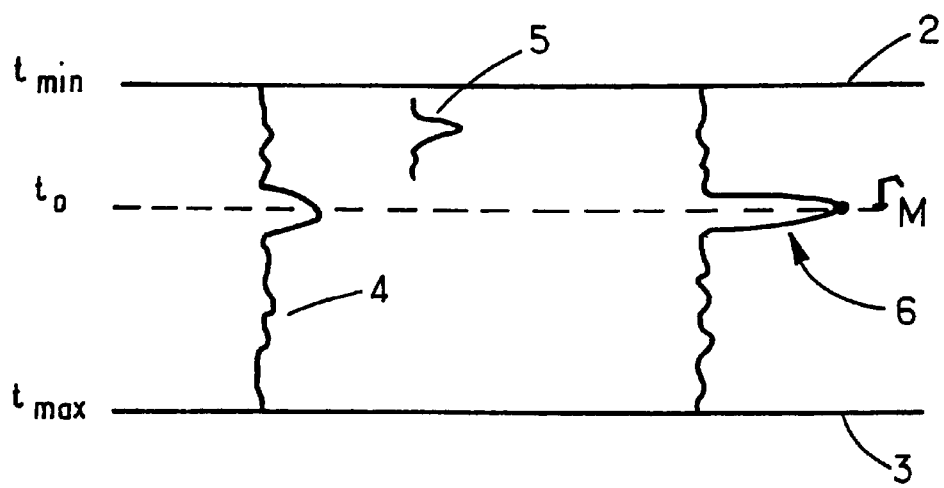
FIG. 3 is a schematic representation of a seismic trace in a given interval and the result of the correlation with an anomalous model.

On FIG. 3, it is represented a portion of the seismic trace 4 within levels 2 and 3 that correspond to the times $t_{min}$ and $t_{max}$ respectively. A model 5, representing an anomaly is represented as a signal (step 14).

Figure 5A:
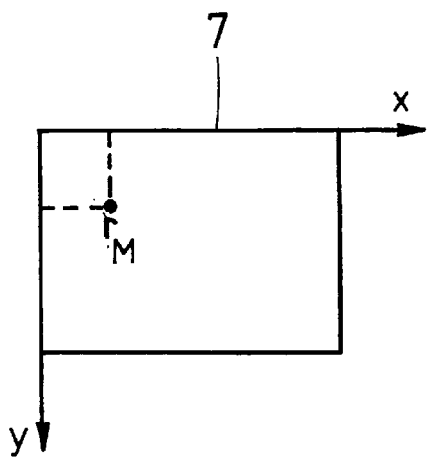
FIGS. 5a and 5b are schematic and partial representations of a map of maxima correlation and a isochronal map, respectively.
Figure 5B:
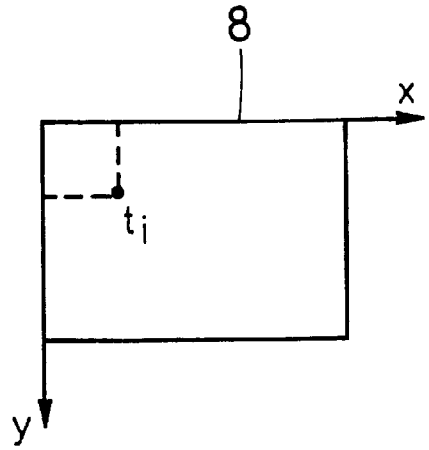
Figure 7:
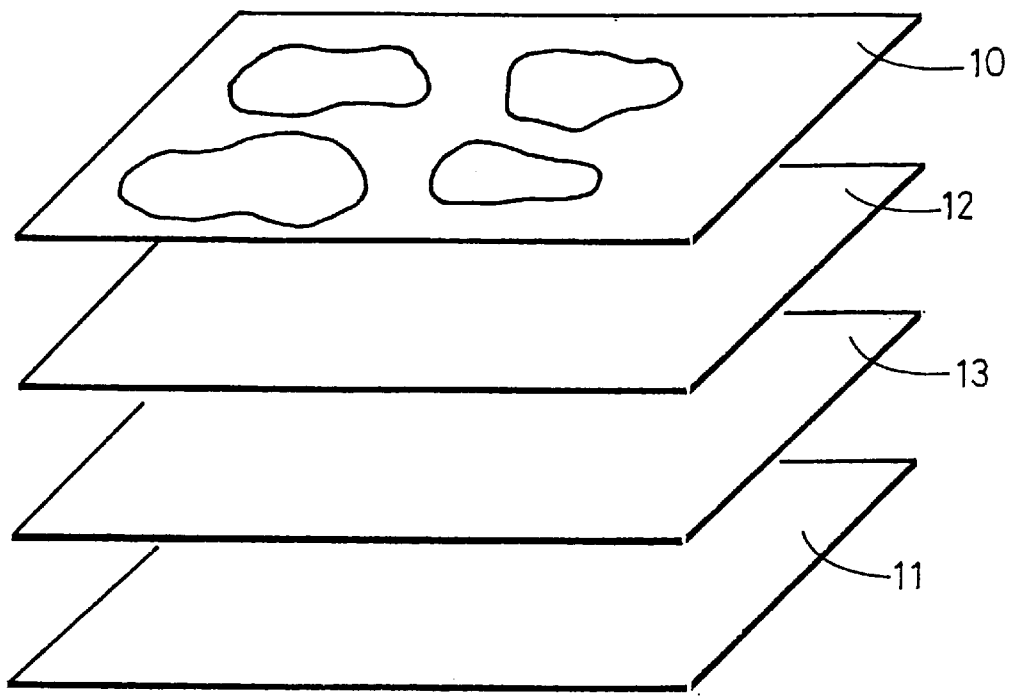
FIG. 7 is a schematic representation of a ranking or sorting of anomalies.
Figure 8:
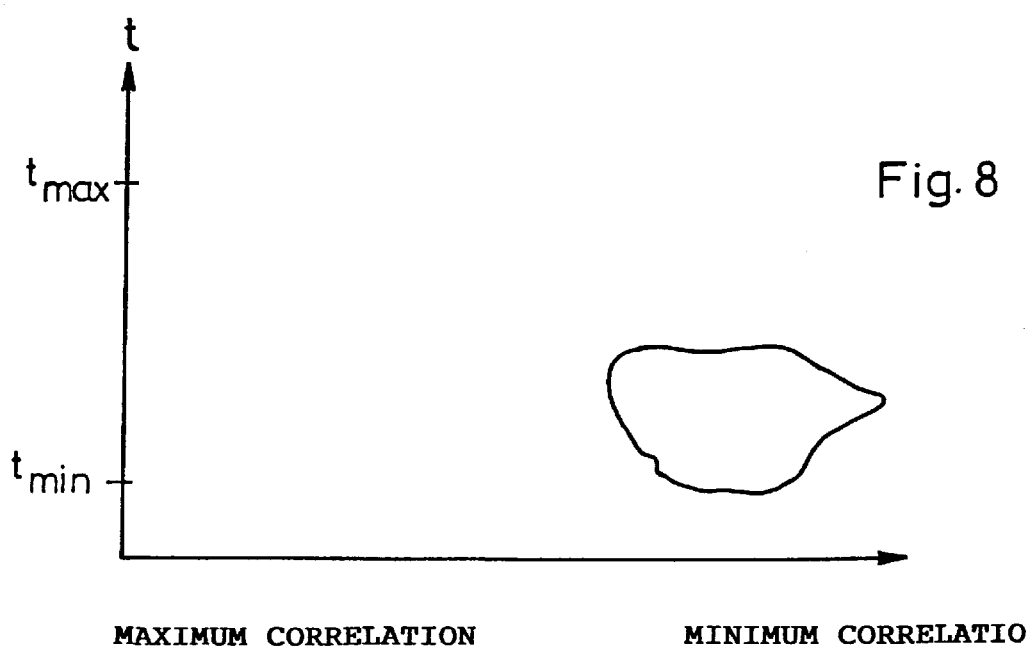
FIG. 8 is a schematic representation of a validated anomaly.
Figure 9:
FIGS. 9 and 10 are representations of anomalies sorted on different levels and originating from the sorting of the schematic in FIG. 11 is a flow chart of a method of the present invention used to detect and localize anomalies.
Figure 10:
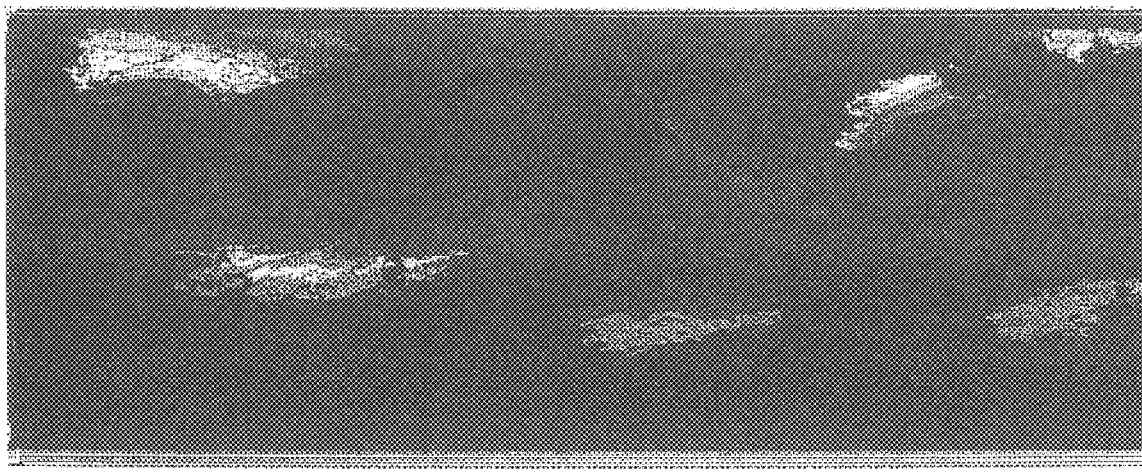
Figure 11:
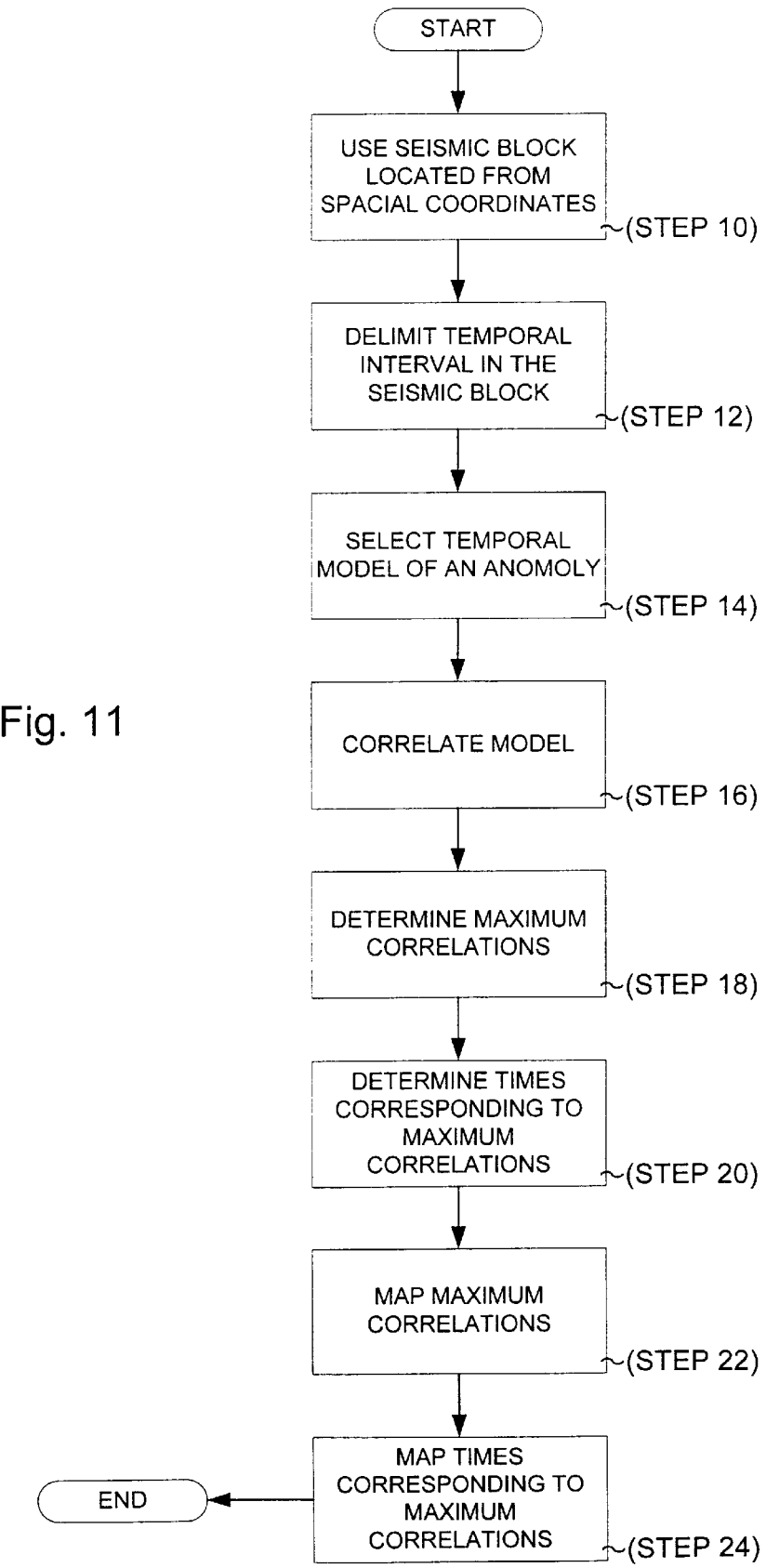

In a first step, the model 5 is correlated with a portion of trace 4 in a way to get a correlated signal 6 (step 16) where the maximum correlation is $\Gamma_M$. The time or index $t_o$ of the maximum correlation $\Gamma_M$ is taken. Then this step is carried out for every portion of the seismic traces within levels 2 and 3 in a way to obtain values of maximum correlation $\Gamma_M$ (step 18) and indices $t_i$ (step 20). This allows to create two maps of FIGS. 7 and 8 where one FIG. 7 corresponds to the maximum correlation $\Gamma$ (FIG. 5a) (step 22) and the other FIG. 8 to the index $t_i$ (FIG. 5b) (step 24), the later called isochronal map. The two maps FIGS. 7 and 8 are of equal dimension to the spatial dimensions of block 1 and located in the same axial system, x, y for example.

In a second step, the anomalies are sorted. A threshold S of correlation is determined and only those anomalies with a maximum correlation $\Gamma_M$ over the threshold S are kept, then each anomaly is extented to find the connex components of the anomaly, the above mentioned extensions being performed on the anomalies where the maximum correlation is greater than S. The search for connex components is done on an isochronal map (FIG. 6) on which for example four points P1 to P4 of coordinates $(t_1, x_1)$, $(t_2, x_2)$, $(t_3, x_3)$, and $(t_4, x_4)$ are reported and corresponding to four consecutive seismic traces. Two points, P, Q belong to a connex component if there is a path formed by the points of the connex component linking P to Q. Two neighboring points $P_i (x_i, t_i)$ and $P_j (x_j, t_j)$ belong to the same connex component if $|t_j-t_i|<\Delta t$ where $\Delta t$ is a value of the predetermined threshold.

Figure 6:
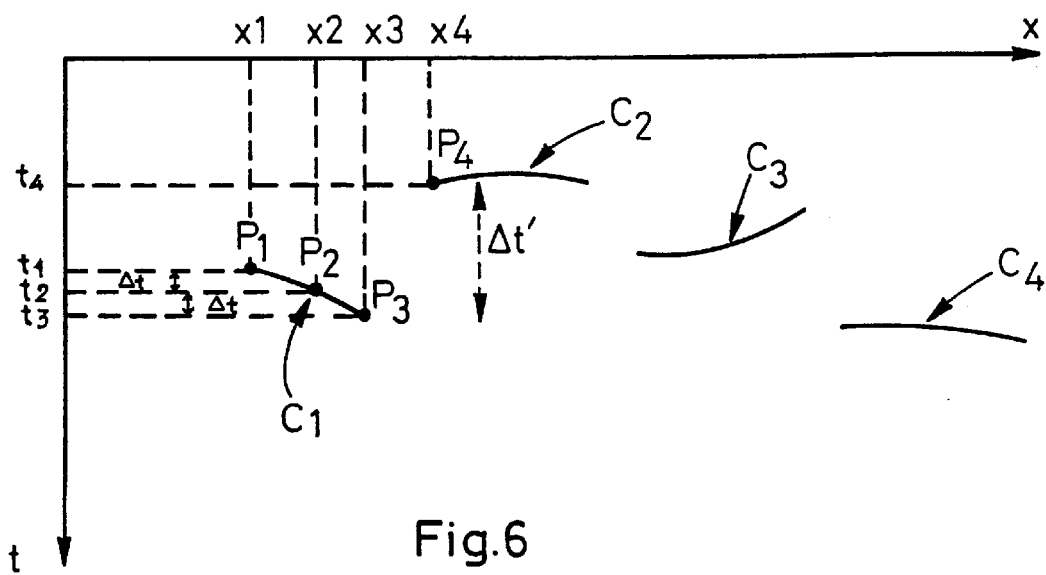
FIG. 6 is a schematic representation of related components.

Thus, on FIG. 6 points P1 to P3 belong to the same connex component because $|t_2-t_1|<\Delta t$ and $|t_3-t_2|<\Delta t$. On the other hand, point $P_4(x_4, t_4)$ does not belong to this connex component since $|t_4-t_3|=\Delta t'>\Delta t$.

Another criteria selection or sorting could consist of rejecting all the anomalies with a maximum correlation higher than S, but where the size is smaller than a given size.

The connex components $C_1$, $C_2$, $C_3$ and $C_4$ . . . are then referenced or numbered so that the isochronal map has numbered connex components.

In a third step, every anomaly is extended with a propagator to solve the problem of hidden anomalies.

Figure 4:
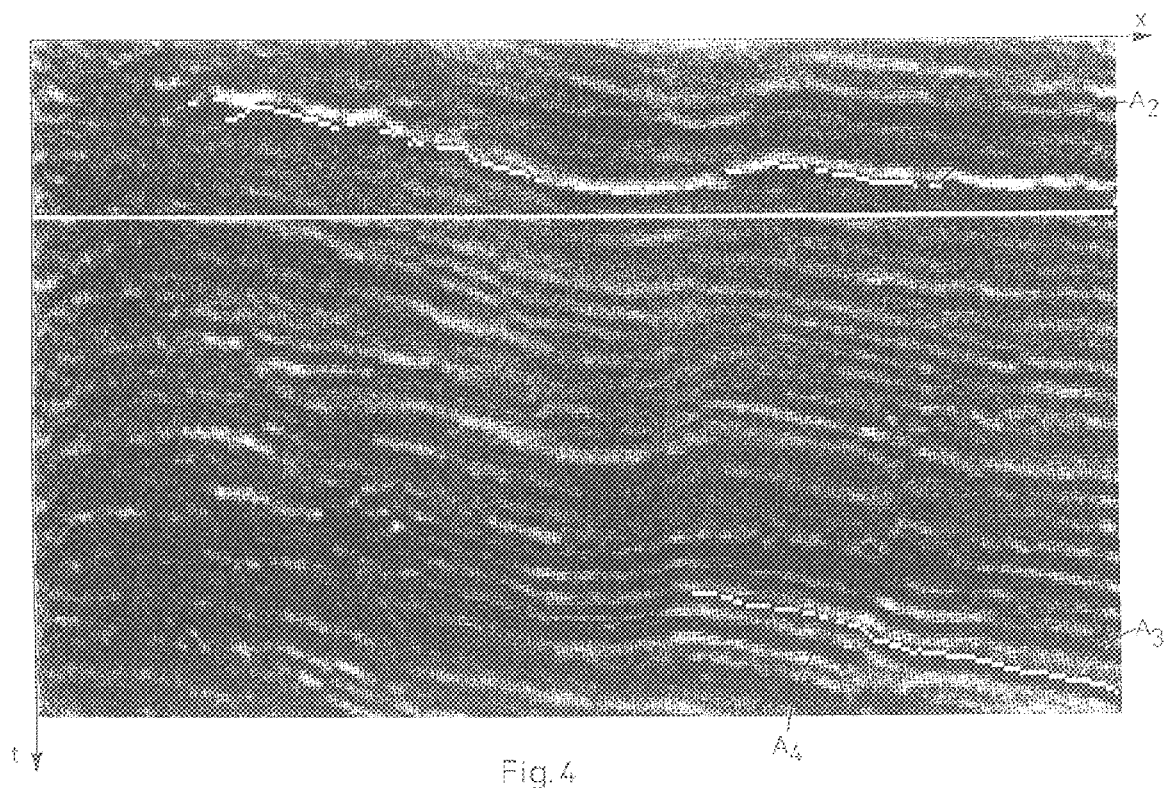
FIG. 4 is an enlarged view of part of a seismic section (x, t) containing anomalies.

On FIG. 4, it can be seen that the anomaly $A_2$ is unique and has not been overlapped by another nearby anomaly. Anomalies $A_3$ and $A_4$ partially overlap each other but, due to the extension created by the propagator, they are distinguished from one another with distinct boundaries.

The extension of every anomaly is carried out in every direction and is controlled closely by their correlation with the seismic traces of the boundaries or outline of the above mentioned anomaly with neighbouring seismic traces. The extension of the anomaly is stopped when the above mentioned controlled correlation becomes a maximum correlation below the threshold S. Thus, the propagator finds the complement of the anomaly, partially hidden by one of several other anomalies.

In a fourth step, the anomalies which are stretched by the propagator are classified in the form of multiple maps whereby each contains anomalies which do not cover each other. Preferably, the map of these anomalies (FIG. 7) are classified by the decreasing order of their maximum correlation. The upper map 10 in FIG. 7 corresponds to the highest maximum correlation while the lower map 11 corresponds to the weakest maximum correlation, the two other maps 12 and 13 corresponding to intermediate maxima correlation.

In a fifth step, the anomalies are validated by pointing out the maxima correlation corresponding to minimum times (FIG. 8).

It is possible to establish marker cards for each anomaly, every marker card containing information relating to the above mentioned anomaly like for example, the amplitude, the size, the surface, the origin, etc.

We claim:

1. A method for locating and identifying the anomalies of a medium, said method comprising the steps of:

using a given seismic block composed of seismic traces located from their spatial coordinates;

delimiting in said seismic block at least one temporal interval between an upper level and a lower level;

selecting a temporal model of an anomaly;

correlating said model with each of said traces within said temporal interval;

determining, for each trace, the maximum correlation ($\Gamma_M$) and time ($t_i$) corresponding to the maximum correlation;

mapping the maximum correlations equal to the spatial dimensions of the seismic block and mapping said times corresponding to the maxima correlation; said time map having the same dimensions and referenced in the axial system as the map of the maxima correlation.

2. Method according to claim 1, wherein the time map is segmented in several of connex and homogeneous zones, each connex and homogeneous zone is such that a point in said zone comprises at least a neighbouring point not containing discontinuity in time higher than a given threshold ($\Delta t$).

3. Method according to claim 2, wherein all homogeneous zones are selected where there is at least one point of maximum correlation above a predetermined threshold of correlation.

4. Method according to claim 2, wherein each homogeneous zone is of a surface greater than a given value.

5. Method according to claim 2, wherein each homogeneous zone is dealt individually by a propagator to spread the above mentioned zone in all directions while controlling the correlation with the neighbouring seismic traces.

6. Method according to claim 1, wherein the homogeneous zones and their extension make anomalous zones which are organized in a number of layers in such a way that in each layer, two anomalous zones, whatsoever, do not cover one another.

7. Method according to claim 6, wherein the layers are in decreasing order relative to their maxima correlation.

8. Method according to claim 1 wherein each anomaly is validated by controlling the time-correlation relationship so that only the anomalies having a maximum correlation for a minimum time are kept.

* * * * *